United States Patent
Depew et al.

(10) Patent No.: US 6,215,476 B1
(45) Date of Patent: Apr. 10, 2001

(54) FLAT PANEL DISPLAY WITH INTEGRATED ELECTROMAGNETIC PEN DIGITIZER

(75) Inventors: John M. Depew, Sunnyvale; David C. Northway, San Jose, both of CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 08/948,775

(22) Filed: Oct. 10, 1997

(51) Int. Cl.[7] .................................................. G09G 5/00
(52) U.S. Cl. ........................ 345/173; 345/179; 345/156; 178/19.01; 178/18.01
(58) Field of Search .................................. 345/173, 176, 345/179, 182, 183, 102, 104, 156; 178/18.01, 18.06, 18.1, 19.01, 19.03

(56) References Cited

U.S. PATENT DOCUMENTS

| | | | |
|---|---|---|---|
| 5,120,908 | 6/1992 | Zank et al. ................ | 178/19 |
| 5,122,623 | 6/1992 | Zank et al. ................ | 178/19 |
| 5,225,637 | * 7/1993 | Rodgers et al. ........... | 178/19 |
| 5,349,139 | * 9/1994 | Verrier et al. ............. | 345/179 |
| 5,402,151 | * 3/1995 | Durwaer .................... | 345/179 |
| 5,466,895 | * 11/1995 | Logan ....................... | 178/19 |
| 5,633,660 | * 5/1997 | Hansen et al. ............ | 345/173 |
| 5,670,755 | * 9/1997 | Kwon ........................ | 178/19 |
| 5,730,602 | * 3/1998 | Gierhart et al. .......... | 434/155 |
| 5,754,169 | * 5/1998 | Yashiro ..................... | 345/173 |

* cited by examiner

Primary Examiner—Vijay Shankar
Assistant Examiner—Mansour M. Said
(74) Attorney, Agent, or Firm—Beyer Weaver & Thomas, LLP

(57) ABSTRACT

An electromagnetic pen digitizer is integrated into a flat panel display assembly using "bent TAB" active electronics. Integration is performed by placing a discrete electromagnetic pen digitizer further inside the flat panel display assembly itself behind the diffuser backlight component, but in front of the "bent TAB" active electronics. Interference from the active electronics is avoided because they are not in between the digitizer and the pen operating upon the flat panel display. The electromagnetic pen digitizer is integrated into the flat panel display assembly by inserting the digitizer into the flat panel display assembly behind the diffuser backlight during the routine manufacture of the flat panel display assembly. Alternatively, the discrete electromagnetic pen digitizer is bonded to the diffuser backlight earlier in the manufacturing process; the combined diffuser backlight/digitizer component is placed into the flat panel display assembly during the routine manufacture of the complete flat panel display assembly. By integrating such a digitizer into the routine manufacturing process of a flat panel display, a standard "off-the-shelf" flat panel display may be used. The digitizer may be directly coated onto the diffuser backlight through an indium tin oxide (ITO) coating on the backlight itself. Also, an electromagnetic digitizer may be fabricated onto the front of the diffuser backlight by using a thin-film etched flexible circuit technique or a silk screen printed thin-film technique. Integrating an electromagnetic pen digitizer in this fashion allows for greater use of "off-the-shelf" display panels with only slight modifications.

24 Claims, 5 Drawing Sheets

Flat Panel Display Assembly

Flat Panel Display Assembly

FLAT PANEL DISPLAY WITH INTEGRATED ELECTROMAGNETIC PEN DIGITIZER

FIELD OF THE INVENTION

The present invention relates generally to a display screen of a computer system. More specifically, the present invention relates to an electromagnetic pen digitizer that is integrated into a flat panel display.

BACKGROUND OF THE INVENTION

Within a computer system, numerous techniques exist for inputting data and commands from a user to the computer system. One technique is to use a special computer "pen" for entering information via a display screen of a computer system. A user moves the pen around on the screen, inputting or selecting information to be transmitted to the computer system.

A variety of technologies exist for inputting information to a computer system using a pen. One such technique uses a special pen in conjunction with an electromagnetic pen digitizer that is placed behind the display unit of a computer system. By moving the pen around on the glass screen of a display unit, and/or by pressing the pen against the glass screen, the electromagnetic pen digitizer is able to receive information from the pen and transmit this information to the computer system. The pen is able to transmit information using electromagnetic signals that are picked up by antenna on the digitizer. One advantage of using an electromagnetic pen digitizer is that this technology is able to input information from the pen such as its X, Y coordinates on the display, pen button status, the tilt of the pen and the pressure of the pen on the glass screen. Such electromagnetic pen digitizers are especially useful in (but not limited to) flat panel display assemblies of a portable computer.

As shown in FIG. 1, electromagnetic pen digitizers to date have been assembled with flat panel displays simply by placing a discrete digitizer implemented using standard printed circuit board technology completely behind the flat panel display (including being behind the diffuser backlight and behind the active display electronics). FIG. 1 shows a display unit 10 of a computer system having a flat panel display assembly 12 and an electromagnetic pen digitizer 14. Digitizer 14 is a standard electromagnetic pen digitizer. Display 12 includes viewable area 16 through which information is presented to the user and through which the user may input information, and an outside side area 18 that is not used for presenting or inputting information. In older generations of flat panel displays, side area 18 is relatively large compared to viewable area 16 and incorporates the active display electronics 20 that control the presentation of information on viewable area 16 of display 12.

As can be seen in FIG. 2, active display electronics 20 are located in side area 18 outside of viewable area 16 of display 12. Thus, because side area 18 is relatively large compared to viewable area 16, electronics 20 are easily incorporated to the side of viewable area 16. Thus, electronics 20 do not interfere with the interaction between a special pen moving on viewable area 16 and electromagnetic pen digitizer 14 located behind display 12. In other words, having electronics 20 to the side of area 16 prevents electronics 20 from interfering with electromagnetic signals between the pen and the digitizer. Such a design for a display unit is workable, although viewable area 16 may be relatively small.

As flat panel display technology moves forward, the overall size of a display unit has been shrinking due to designs in which the active display electronics are located directly behind the viewable area of the display. By locating the active electronics behind the viewable area, space is saved at the sides of a flat panel display assembly and allows for an overall smaller package. Also, as the side areas of a flat panel display assembly are no longer needed to incorporate the active display electronics, the viewable area of the display may also be made larger, with attendant advantages for a user.

FIG. 3 illustrates an example of a display unit in which the active display electronics are placed behind the viewable area of the display. Shown is a display unit 30 having a flat panel display assembly 32, a viewable area 36, side area 38 and active display electronics 40. As electronics 40 are now located directly behind viewable area 36, side area 38 may now be made much smaller relative to viewable area 36. Thus, the overall size of display unit 30 may be reduced, or alternatively, the size of viewable area 36 may be increased. Each of these alternatives has various advantages. One technique for locating electronics 40 behind viewable area 36 literally "folds" the electronics in behind viewable area 36. This technique, often referred to as "bent TAB" or "folded TAB", uses a printed circuit board attached via flexible ribbon cable ("flex cable") to the mother glass of the flat panel display assembly. Attached to the flex cable are a number of integrated circuit drivers that are attached using tape-automated bonding (TAB) construction technology. This "bent TAB" technique allows active electronics 40 to be placed behind viewable area 36. Of course, other techniques aside from "bent TAB" may be used in order to place the active electronics behind a viewable area.

Unfortunately, attempting to place a discrete electromagnetic pen digitizer behind a flat panel display assembly that includes active electronics behind the viewable area is not possible due to the interference of the electromagnetic energy and the electromagnetic shielding induced by the active electronics. In other words, when the active electronics are located directly in front of a discrete electromagnetic pen digitizer, the electromagnetic signals between a pen on the display screen and the digitizer are blocked or distorted by the electronics.

FIG. 4 illustrates a display unit 50 in which this situation occurs. Flat panel display assembly 32 has a viewable area 36, side areas 38 and active display electronics 40. Active electronics 40 are located in between viewable area 36 and an electromagnetic pen digitizer 34. Electronics 40 interfere with communication between pen 52 and digitizer 34.

Digitizer 34 is basically a sensor panel that includes numerous antenna for receiving a signal from pen 52, and may also serve as a power source for pen 52. In operation, digitizer 34 sends an energy pulse to pen 52 which receives power for operation from the energy pulse, or is triggered by the energy pulse to transmit for pen battery systems. Pen 52 is then able to transmit information such as pen button status and pressure to digitizer 34 by broadcasting a relatively weak electromagnetic signal. Digitizer 34 derives location and tilt of the pen by looking at the relative signal strengths from the antennas in the digitizer. Because the signal is relatively weak, electronics 40 create interference. Although various manufacturers have attempted to solve this problem (such as by changing the frequency of the pen, by increasing signal strength via a pen battery, by decreasing maximum pen resolution or by reducing the active pen area), a workable solution for this type of display assembly is yet to be found. Therefore, display units that include a flat panel display assembly along with an electromagnetic pen digitizer are typically only implemented with a small viewable area and a large side area in which the active electronics are incorporated. Large viewable areas of display units such as is shown in FIG. 3 that are made possible with technologies such as "bent TAB" have proven extremely difficult to use with an electromagnetic pen digitizer.

Other types of digitizers for detecting the location of a pen on a screen are in use, but these have a variety of disadvantages. For example, a resistive membrane may be placed on top of a flat panel display assembly. However, because this membrane is placed on top of the display, less light is transmitted, and more power is needed to increase light from the backlight unit. However, this technique is not well suited for a portable computer having a flat panel display where power is at a premium. Another technique uses electrostatic capacitance in which an indium tin oxide (ITO) conductive film is also placed on top of the display. Similar to the previous problem, because this film is on top of the display, it reduces the light transmitted and more power is required. In addition, this conductive film is implemented as a grid upon the display which also causes interference with the display of information to a user. Also, these techniques only supply the pen location and pen button status and not tilt or pressure. An electromagnetic pen digitizer is more desirable as it is able to receive and to derive much more information from a broadcasting pen. For example, tilt is not obtained from the pen, but is calculated from the digitizer sensor panel.

Another technique uses LED lights around the perimeter of a screen which indicate the location of a pen when their light path is broken. However, in addition to not providing tilt or pressure information (only X,Y coordinates), the resolution provided by this technique is too low for acceptable use on a high definition flat panel display. Thus, although other digitizers aside from an electromagnetic digitizer may be used, each has a variety of drawbacks. An electromagnetic digitizer is able to provide location, tilt and pressure information which is advantageous in many situations.

Therefore, it is desirable to provide a technique by which an electromagnetic pen digitizer may be used with a flat panel display assembly having electronics behind a viewable area. It is further desirable that such a technique have the lowest fiscal and manufacturing impact to existing flat panel display assemblies in order to avoid potentially large capital costs and development time required to develop a flat panel display assembly that is custom built for use with an electromagnetic pen digitizer.

SUMMARY OF THE INVENTION

To achieve the foregoing, and in accordance with the purpose of the present invention, a technique for integrating an electromagnetic pen digitizer with a flat panel display assembly is disclosed.

Integration of such a digitizer with a flat panel display with active electronics is performed by placing a discrete electromagnetic pen digitizer inside the flat panel display assembly itself behind the diffuser backlight component, but in front of the active electronics. Thus, interference from the active electronics is avoided because they are not in between the digitizer and the pen operating upon the flat panel display. In one embodiment, "bent TAB" technology is used to fabricate the active display electronics.

By integrating a discrete electromagnetic pen digitizer into a standard flat panel display assembly, the digitizer is as close to the pen as possible and is in front of the active electronics, thus avoiding interference. A digitizer closer to the pen receives a more accurate signal from the pen and produces less jitter. By integrating a relatively thin digitizer into a standard flat panel display assembly, a complete flat panel with pen functionality may be produced at a lower cost and much more quickly than designing and building from scratch a custom flat panel display assembly that incorporates pen functionality. For example, techniques that produce an antenna grid directly onto the mother glass can be extremely expensive and difficult to engineer. Such techniques are the subject of research by companies such as Sharp and Lucky Goldstar. By contrast, the present invention allows a digitizer to be relatively inexpensively and easily inserted into a standard flat panel display assembly.

In one embodiment of the invention, the electromagnetic pen digitizer is integrated into the flat panel display assembly by inserting the digitizer into the flat panel display assembly behind the diffuser backlight during the routine manufacture of the flat panel display assembly. Alternatively, the discrete electromagnetic pen digitizer may be bonded to the diffuser backlight earlier in the manufacturing process; the combined diffuser backlight/digitizer component is then placed into the flat panel display assembly during the routine manufacture of the complete flat panel display assembly. By integrating such a digitizer into the routine manufacturing process of a flat panel display, a custom flat panel display need not be designed. A standard "off-the-shelf" flat panel display may be used.

Furthermore, the digitizer may be directly integrated onto the diffuser backlight through an indium tin oxide (ITO) coating on the backlight itself, thus eliminating the need for an additional, separate, discrete electromagnetic pen digitizer. In addition to forming a digitizer directly onto the diffuser backlight by using an ITO coating, an electromagnetic pen digitizer may also be fabricated onto the front of the diffuser backlight by using a thin-film etched flexible circuit technique or a silk screen printed thin-film technique. Such thin film digitizers are more easily integrated into a standard flat panel display assembly having a fixed width.

Integrating an electromagnetic pen digitizer in this fashion allows for greater use of "off-the-shelf" display panels with only slight modifications in order to add the extra pen functionality to such a display panel. Traditional flat panel displays that are designed from the ground up to be integrated with an electromagnetic pen digitizer may cost from $250,000 to $500,000. By contrast, use of the present invention could cost at little as $5,000 to $25,000 in order to make such modifications to "off-the-shelf" display panels.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The present invention provides an apparatus and technique by which an electromagnetic pen digitizer may be integrated into a standard flat panel display assembly that includes active display electronics located directly behind the viewable area of the display.

Figure 1:
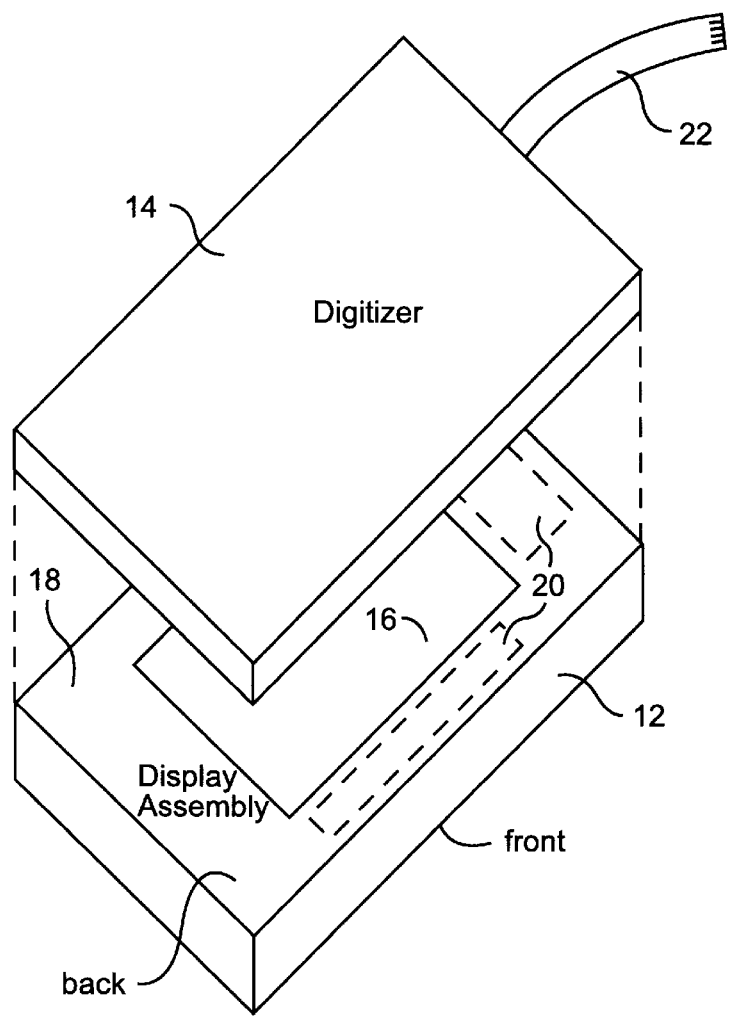
FIG. 1 is a perspective view of a display unit of a computer system in which a digitizer is placed behind a flat panel display assembly.
Figure 2:
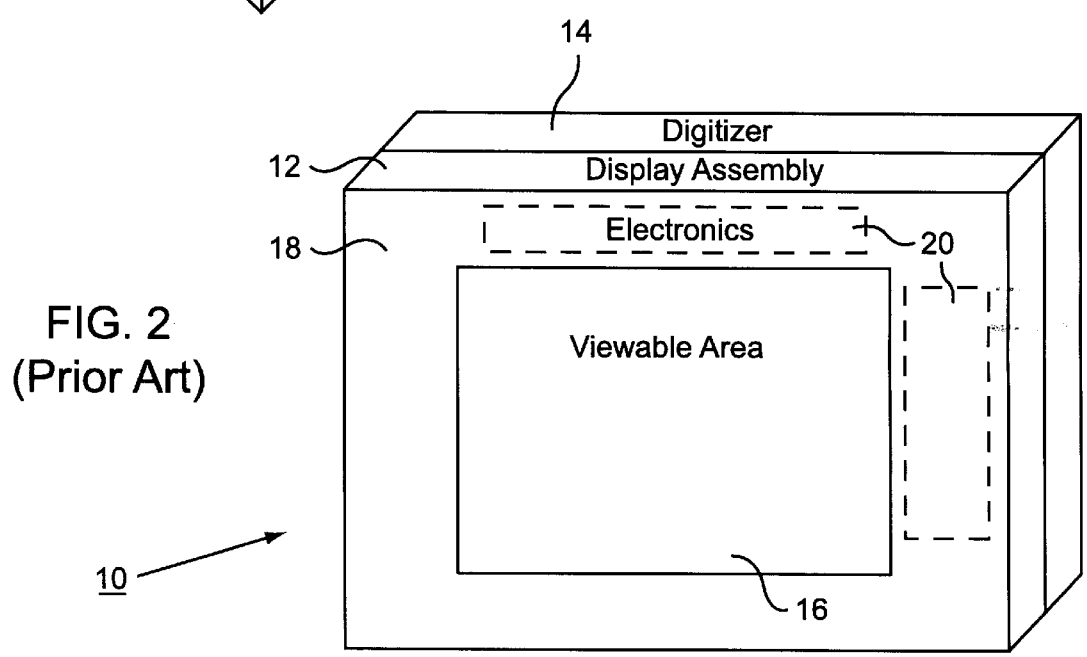
FIG. 2 is a front view of the display unit of FIG. 1.
Figure 3:
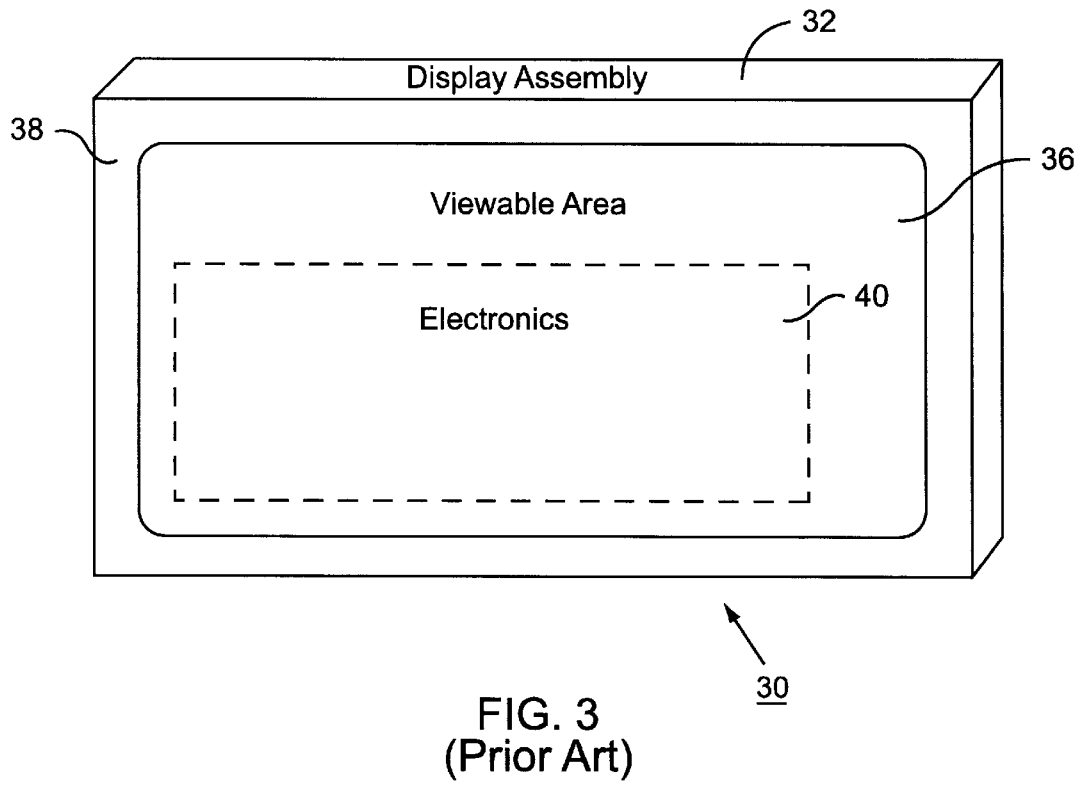
FIG. 3 is a front view of a flat panel display assembly having active display electronics located behind its viewable area.
Figure 4:
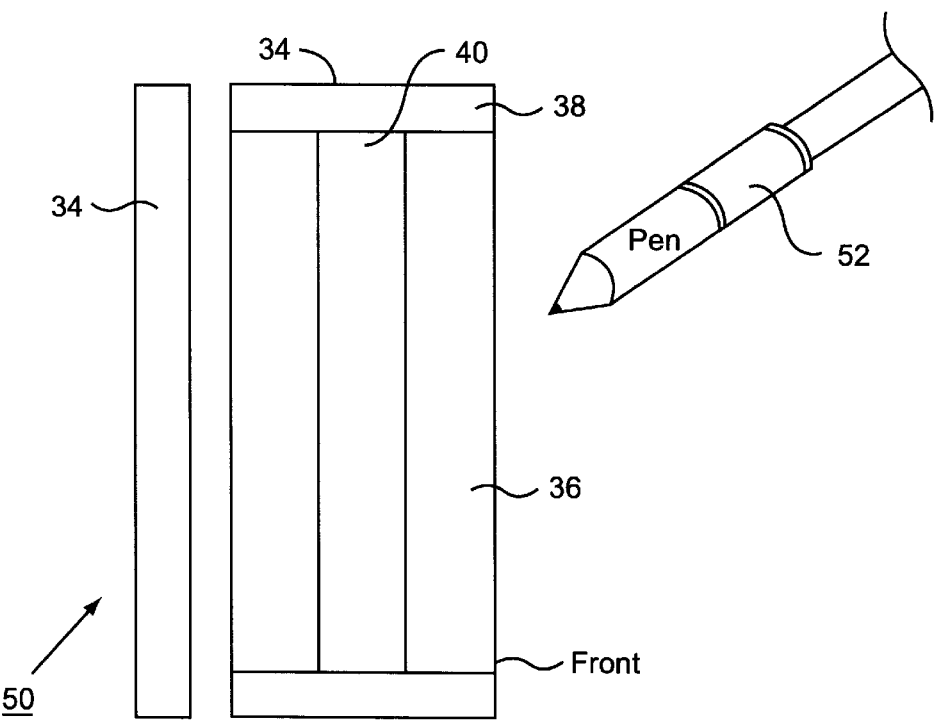
FIG. 4 is a side view of the display assembly of FIG. 3 in which an electromagnetic pen digitizer is placed behind the display assembly.
Figure 5:
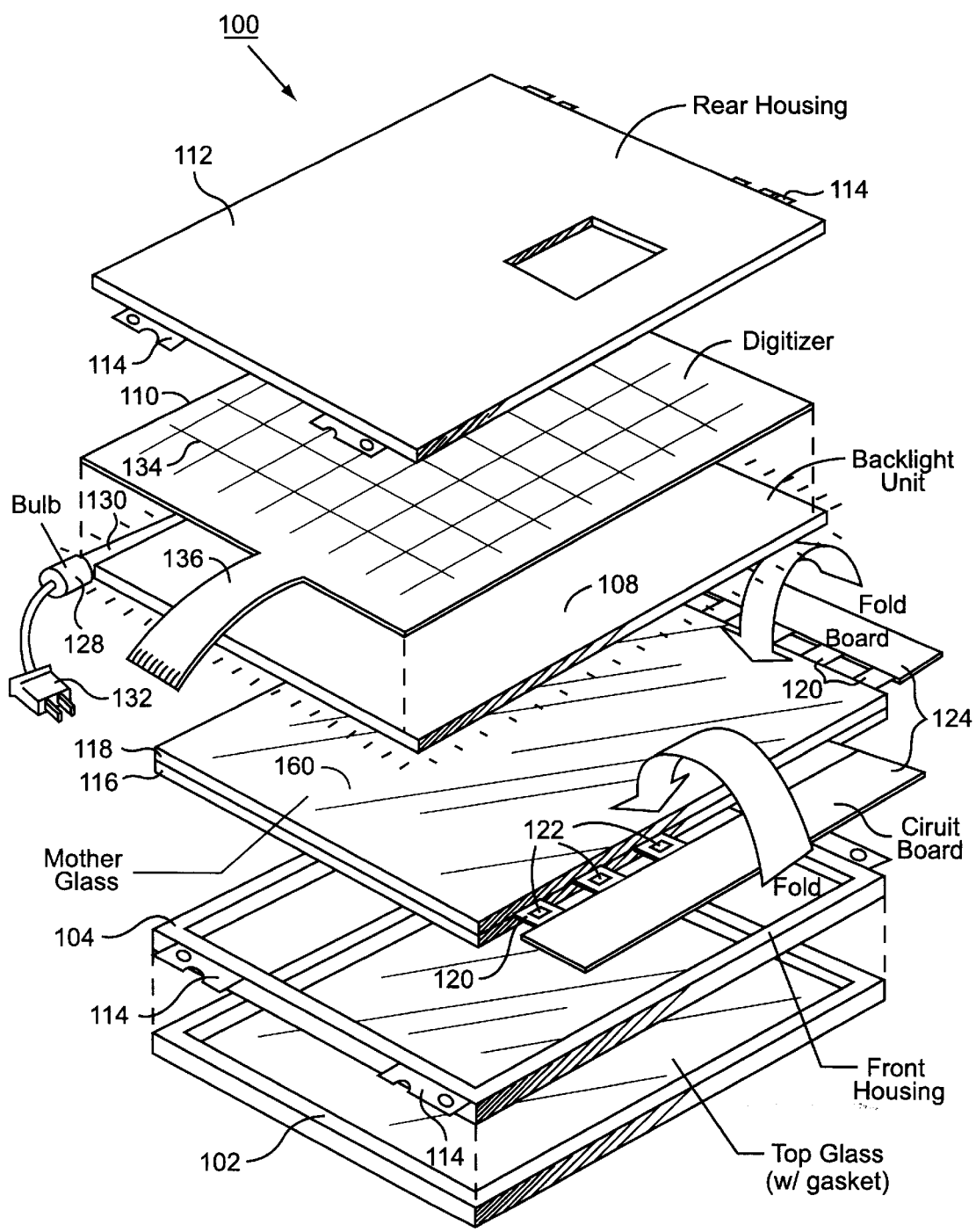
FIG. 5 is an exploded perspective view of a discrete electromagnetic pen digitizer integrated into a flat panel display assembly according to one embodiment of the present invention.

FIG. 5 is an exploded perspective view of a flat panel display assembly 100 incorporating an embodiment of the present invention. Display assembly 100 may originally be any standard "off-the-shelf" flat panel display assembly for use with a laptop computer, desktop computer, portable computer, personal digital assistant (PDA), etc. The present invention is suitable for use with any display that uses an interactive electromagnetic digitizer that is operated using a pen, stylus, similar tool or even a user's finger. By way of example, the present invention is particularly well suited for use on a portable computer in which screen size and power consumption are at a premium.

Flat panel display assembly 100 includes top glass 102, front housing 104, mother glass 106, backlight unit 108, electromagnetic pen digitizer 110 and rear housing 112. Top glass 102 is any suitable glass for protecting the display from the outside world and may also include a gasket for use in sealing the assembly. Front and rear housings 104 and 112 are any suitable housings for holding the assembly together, and include brackets 114 for securing the assembly.

Mother glass 106 may be any of a variety of units for the display of information to a user. By way of example, mother glass 106 may incorporate an LCD display, a plasma display or similar. Mother glass 106 may be of glass, plastic, or other suitable material used for the presentation of information in a computer system.

By way of example, mother glass 106 includes glass 116 and glass 118 between which is sandwiched an LCD display (not shown). Connected to the LCD display to assist in its operation are a number of flex cables 120 onto which are bonded integrated circuit drivers 122 using a tape-automated bonding (TAB) construction technique. Attached to flex cables 120 are printed circuit boards 124 that provide control for the LCD display. Connectors located on circuit boards 124 provide an interface to the computer system.

Flex cables 120, drivers 122 and boards 124 constitute the "bent TAB" active display electronics. When the flat panel display is assembled, these active electronics are folded behind not only backlight unit 108, but also behind digitizer 110. Thus, through the use of flex cables of an appropriate length and "bent TAB" technology, the active electronics of a flat panel display are placed behind an electromagnetic pen digitizer so as to not interfere with the interaction between the digitizer and a pen on top glass 102. Preferably, provided that the digitizer is of nominal thickness (about 0.3 mm to 0.5 mm), the cables need not be lengthened from normal.

Backlight unit 108 includes a diffusion layer. In one embodiment of the invention, there are two diffusion layers used to diffuse light throughout the backlight unit. Bulb 128 provides light that travels down tapered light pipe 130 in order to provide light throughout the backlight unit. Attached to bulb 128 is a power cord and plug 132. Because the LCD display does not provide light itself, backlight unit 108 serves to push light through the LCD display so that the information may be viewed by a user. In an alternative embodiment of the invention, if mother glass 106 uses a technology that provides its own light, then backlight unit 108 would not be required.

Electromagnetic pen digitizer 110 includes an antenna grid 134 and a cable 136 for transmitting information to the computer system into which flat panel display assembly 100 is integrated. Because of grid 134, it is preferable for digitizer 110 to be located behind backlight unit 108. Thus, grid 134 is not projected onto mother glass 106. In an alternative embodiment of the invention, if grid 134 is not present, is extremely fine, or is otherwise negligible, then digitizer 110 may also be placed in front of backlight unit 108. When the flat panel display is assembled, the active display electronics of mother glass 106 are folded behind digitizer 110 so as to not interfere with its communication with a pen on the screen.

Digitizer 110 may be formed in a variety of manners. By way of example, digitizer 110 may be any standard electromagnetic pen digitizer implemented on a printed circuit board. In other embodiments, digitizer 110 may be a thin-film etched flexible circuit board, or a silk screen printed thin-film board. Using thin film technology allows the digitizer to be extremely thin and allows a manufacturer of a display assembly to integrate such a digitizer directly into a standard display assembly without needing to retool manufacturing facilities and/or to change the design of the display assembly. In one embodiment of the invention, a digitizer that is approximately 0.3 to 0.5 mm thick works well. By way of example, thin film digitizers are available from Wacom Co. Ltd., Saitama 349-11 Japan, and Calcomp and Lockheed Martin Co. of Scottsdale, Ariz.

Figure 6:
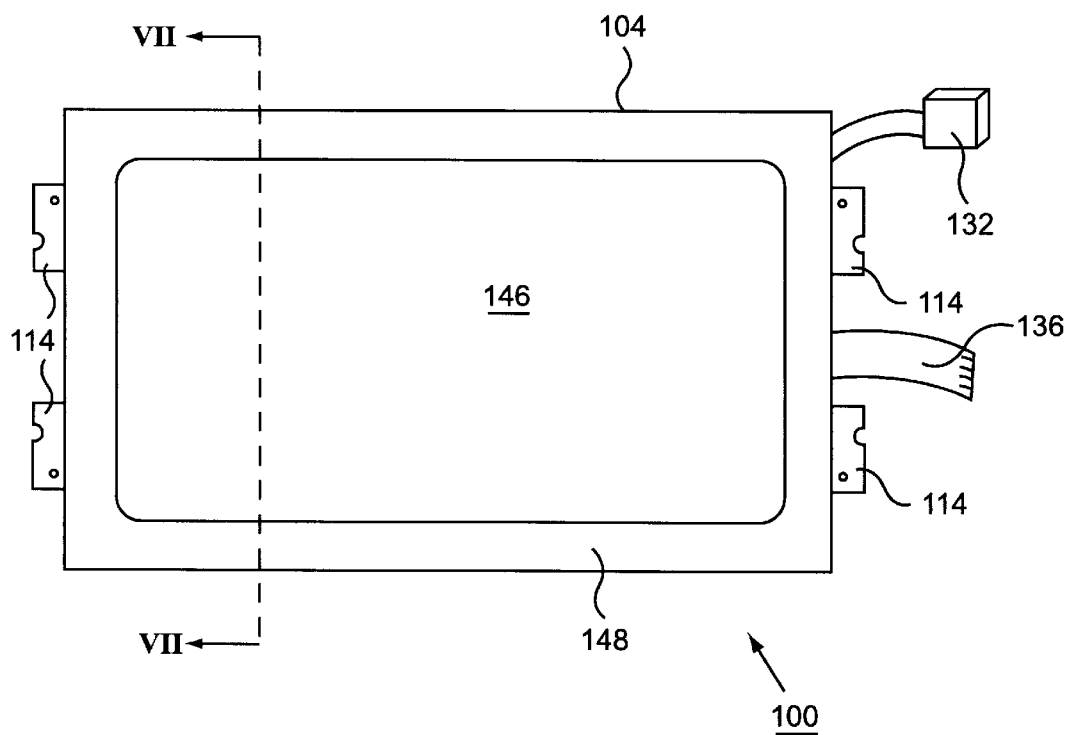
FIG. 6 is a front view of the display assembly of FIG. 5.
Figure 7:
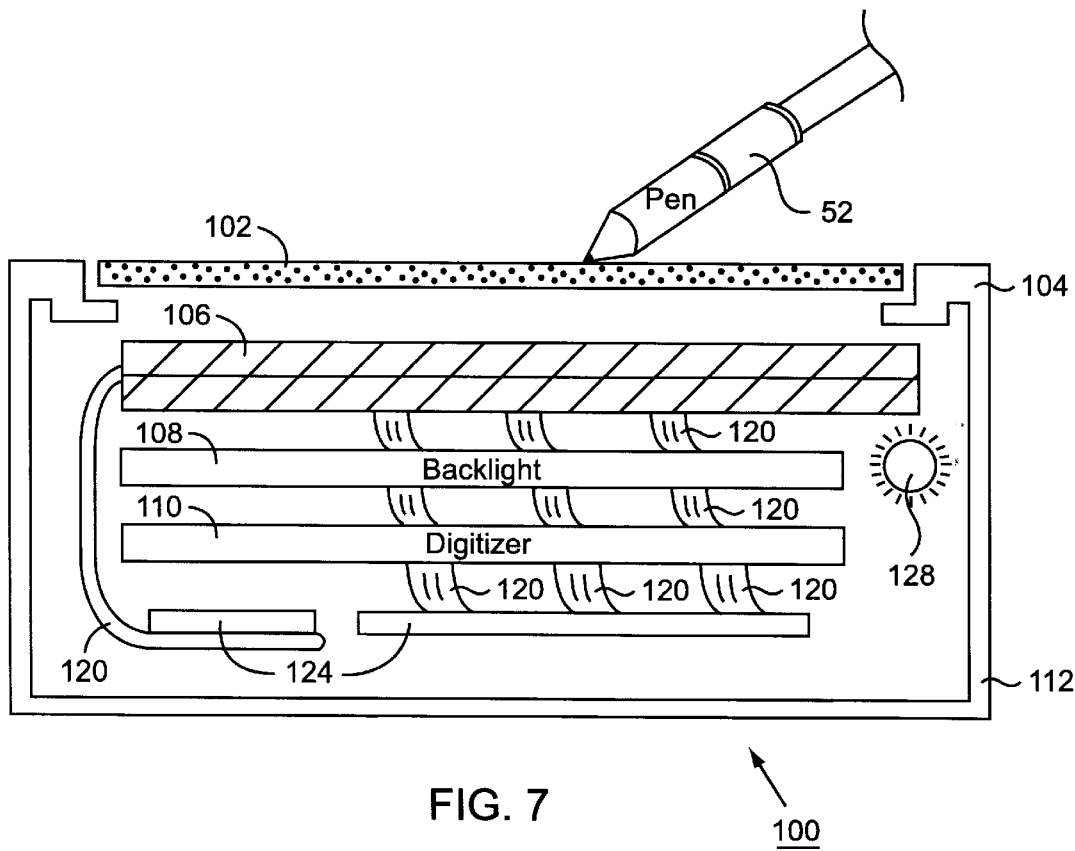
FIG. 7 is a sectional view of the display assembly of FIG. 6.

FIGS. 6 and 7 present different views of display assembly 100. FIG. 6 shows a front view of display assembly 100 illustrating how viewable area 146 of the display is relatively large compared to the outside area 148. FIG. 7 is a sectional view of FIG. 6 taken along line VII—VII. Although FIG. 7 is presented in an expanded view for clarity, it should be appreciated that normally all of the glass, electronics, backlight, etc., are sandwiched together into a relatively thin package for incorporation into a computer system.

Display assembly 100 is held together by front and rear housings 104 and 112 and includes top glass 102, mother glass 106, backlight 108, and electromagnetic pen digitizer 110 behind which are folded the active display electronics. Digitizer pen 52 is used in conjunction with digitizer 110. Pen 52 may be any of a wide variety of pens suitable for use with an electromagnetic pen digitizer. By way of example, pen 52 may have an attached cord or be cordless, and may be implemented as discussed in U.S. Pat. Nos. 5,120,908 or 5,122,623. A pen having an attached cord receives power through the cord and the digitizer need only operate as a sensor of radio waves. A pen that is cordless receives power inductively from the digitizer and is then able to send energy back to the digitizer. The information that the pen transmits includes pressure, pen button status, etc.

Figure 8:
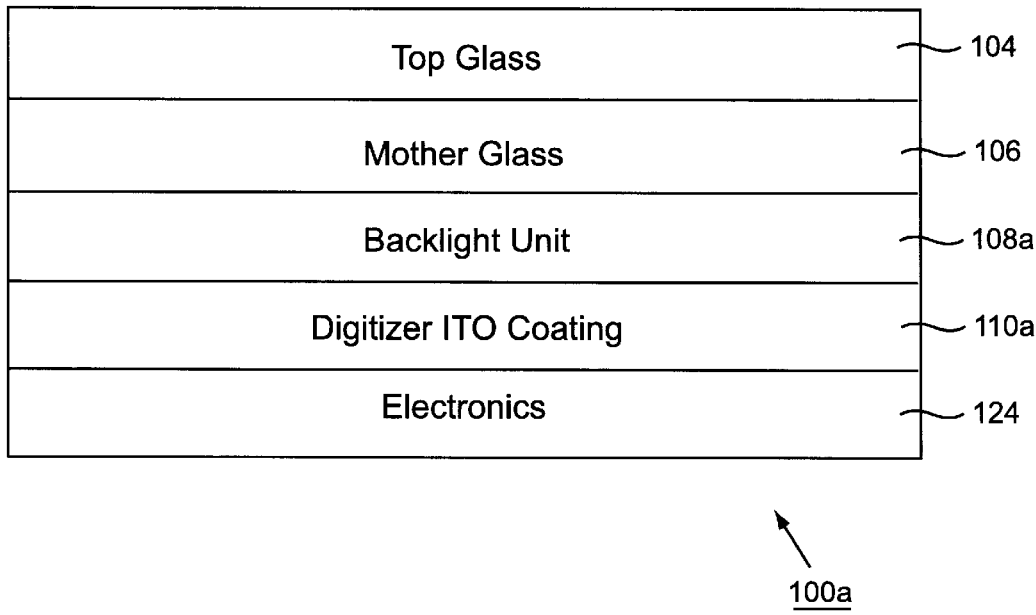
FIG. 8 is a symbolic view of an alternative embodiment of the present invention.
Figure 9:
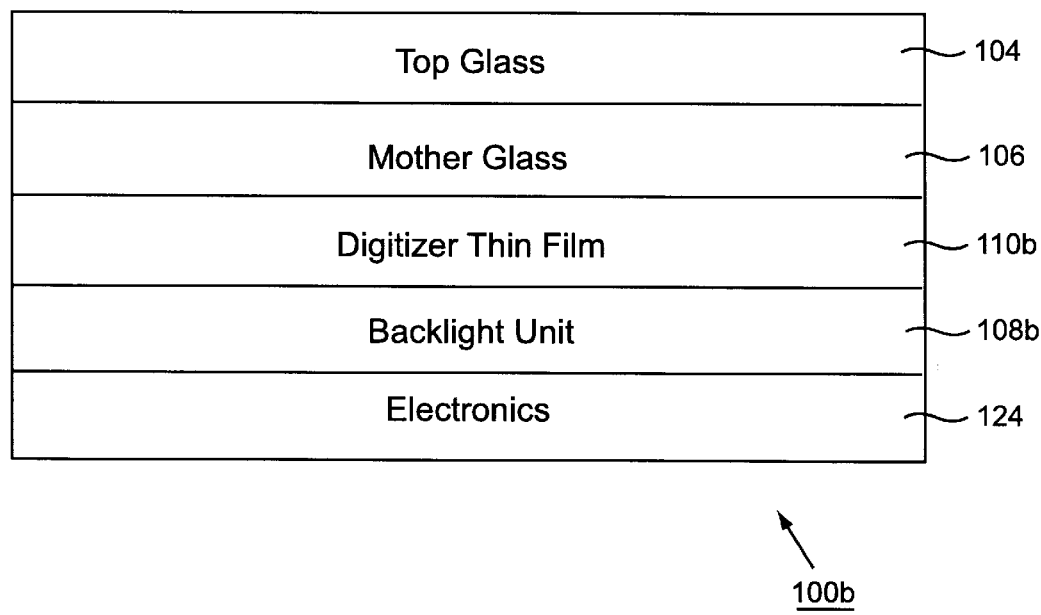
FIG. 9 is a symbolic view of another alternative embodiment of the present invention.

FIGS. 8 and 9 present symbolic views of alternative embodiments of the invention. FIG. 8 illustrates an embodiment of a flat panel display assembly 100a in which an electromagnetic pen digitizer 110a is fabricated on the back side of a backlight unit 108a. Digitizer 110a may be fabricated onto the backlight using any of a variety of coatings such as an ITO coating.

FIG. 9 is an alternative embodiment of a flat panel display 100b in which an electromagnetic pen digitizer 110b is fabricated onto the front side of backlight unit 108b through the use of a clear thin film technology.

Although the foregoing invention has been described in some detail for purposes of clarity of understanding, it will be apparent that certain changes and modifications may be practiced within the scope of the appended claims. For instance, the invention is suitable for use with any display in which the electronics interfere with communication between the pen and the electromagnetic digitizer. Furthermore, the digitizer may be located behind or in front of the backlight unit, and may be coated directly onto the backlight unit. Also, the backlight unit is optional if the mother glass unit supplies its own light, or if light is supplied in some other fashion. The invention is useful with "bent TAB" technology or with any other technique used for placing electronics behind a mother glass unit. Therefore, the described embodiments should be taken as illustrative and not restrictive, and the invention should not be limited to the details given herein but should be defined by the following claims and their full scope of equivalents.

We claim:

1. A flat panel display assembly that allows use of an electromagnetic pen for input of data to a computer system, said flat panel display assembly comprising:

a housing for containing said flat panel display assembly;

a mother unit located within said housing for displaying information from said computer system on said mother unit;

an electromagnetic pen digitizer located within said housing and behind said mother unit, said electromagnetic pen digitizer capable of receiving signals from said electromagnetic pen representing data for input to said computer system; and active display electronics located within said housing and behind said electromagnetic pen digitizer such that said active display electronics do not interfere with said signals from said electromagnetic pen, said active display electronics being in electrical communication with said mother unit and used for controlling said information displayed on said mother unit, said active display electronics being located substantially behind said mother unit such that a viewable area of said flat panel display assembly is relatively large compared to a non-viewable area of said flat panel display assembly.

2. A flat panel display assembly as recited in claim 1 wherein said active display electronics include a flexible cable for attachment to said mother unit and are fabricated using bent tape-automated bonding (TAB) construction, said flexible cable having a sufficient length such that said active display electronics are folded in behind said electromagnetic pen digitizer.

3. A flat panel display assembly as recited in claim 1 wherein said flat panel display assembly is a standard assembly and said electromagnetic pen digitizer is a discrete unit fabricated using flexible circuit technology and is relatively thin such that said discrete electromagnetic pen digitizer is suitable for easy integration into said standard assembly.

4. A flat panel display assembly as recited in claim 3 wherein said discrete electromagnetic pen digitizer has a thickness of about 0.3 mm to about 0.5 mm.

5. A flat panel display assembly as recited in claim 1 wherein said mother unit is a mother glass unit and said assembly further comprises:

a backlight unit located within said housing and behind said mother glass unit and used for providing light to said mother glass unit.

6. A flat panel display assembly as recited in claim 5 wherein said electromagnetic pen digitizer is fabricated directly onto said backlight unit using a thin film coating technique, whereby the thickness of said electromagnetic pen digitizer is reduced and is easily integrated into a standard flat panel display assembly.

7. A flat panel display assembly as recited in claim 6 wherein said thin film coating is an indium tin oxide (ITO) coating being substantially clear.

8. A flat panel display assembly as recited in claim 1 wherein said electromagnetic pen is a cordless pen, and wherein said electromagnetic pen digitizer being further capable of transmitting an energy pulse to said electromagnetic cordless pen to supply power.

9. A flat panel display assembly that allows use of an electromagnetic pen for input of data to a computer system, said flat panel display assembly comprising:

a standard housing for containing said flat panel display assembly;

a mother glass unit located within said housing for displaying information from said computer system on said mother glass unit;

a backlight unit located within said housing and behind said mother glass unit and used for providing light to said mother glass unit;

a discrete electromagnetic pen digitizer located within said housing and behind said mother glass unit, said discrete electromagnetic pen digitizer being relatively thin permitting easy integration into said standard housing and capable of receiving signals from said electromagnetic pen representing data for input to said computer system; and bent tape-automated bonding (TAB) electronics located within said housing and folded behind said discrete electromagnetic pen digitizer such that said bent TAB electronics do not interfere with said signals from said electromagnetic pen, said bent TAB electronics electrically connected to said mother glass unit and used for controlling said information displayed on said mother glass unit, said bent TAB electronics being located substantially behind said mother glass unit such that a viewable area of said flat panel display assembly is relatively large compared to a non-viewable area of said flat panel display assembly.

10. A flat panel display assembly as recited in claim 9 wherein said bent TAB electronics include a flexible cable for attachment to said mother glass unit, said flexible cable having a sufficient length to permit said bent TAB electronics to be folded in behind said discrete electromagnetic pen digitizer.

11. A flat panel display assembly as recited in claim 9 wherein said flat panel display assembly is a standard assembly and said discrete electromagnetic pen digitizer is fabricated using flexible circuit technology permitting easy integration into said standard assembly.

12. A flat panel display assembly as recited in claim 11 wherein said discrete electromagnetic pen digitizer has a thickness of about 0.3 mm to about 0.5 mm.

13. A flat panel display assembly as recited in claim 9 wherein said electromagnetic pen is a cordless pen, and wherein said discrete electromagnetic pen digitizer being further capable of transmitting an energy pulse to said electromagnetic cordless pen to supply power.

14. A method of assembling a flat panel display assembly, said flat panel display assembly suitable for use with an electromagnetic pen for inputting data to a computer system, said method comprising:

provided a housing suitable for containing said flat panel display assembly;

inserting a mother unit within said housing, said mother unit including active display electronics electrically connected with said mother unit and with said computer system, said active display electronics used for controlling information displayed on said mother unit;

inserting an electromagnetic pen digitizer within said housing and behind said mother unit, said electromagnetic pen digitizer capable of receiving signals from said electromagnetic pen representing data for input to said computer system; and placing said active display electronics of said mother unit within said housing and behind said electromagnetic pen digitizer such that said active display electronics do not interfere with said signals from said electromagnetic pen, said active display electronics being located substantially behind said mother unit such that a viewable area of said flat panel display assembly is relatively large compared to a non-viewable area of said flat panel display assembly.

15. A method as recited in claim 14 wherein said active display electronics include a flexible cable for attachment to said mother unit and are fabricated using bent tape-automated bonding (TAB) construction, wherein said step of placing said active display electronics includes the sub-step of:

folding said active display electronics behind said electromagnetic pen digitizer using said flexible cable, said flexible cable having a sufficient length such that said active display electronics may be folded.

16. A method as recited in claim 14 wherein said flat panel display assembly is a standard assembly and said electromagnetic pen digitizer is a discrete unit fabricated using flexible circuit technology and is relatively thin such that said step of inserting an electromagnetic pen digitizer permits easy integration of said discrete electromagnetic pen digitizer into said standard assembly.

17. A method as recited in claim 16 wherein said discrete electromagnetic pen digitizer has a thickness of about 0.3 mm to about 0.5 mm.

18. A method as recited in claim 14 further comprising the step of:

inserting a backlight unit within said housing and behind said mother unit, said backlight unit suitable for providing light to said mother unit.

19. A method as recited in claim 18 wherein said electromagnetic pen digitizer is fabricated directly onto said backlight unit using a thin film coating technique, and said steps of inserting a backlight unit and inserting an electromagnetic pen digitizer are performed as one, whereby the thickness of said electromagnetic pen digitizer is reduced and is easily integrated into a standard flat panel display assembly.

20. A method as recited in claim 19 wherein said thin film coating is an indium tin oxide (ITO) coating being substantially clear.

21. A method of assembling a flat panel display assembly, said flat panel display assembly suitable for use with an electromagnetic pen for inputting data to a computer system, said method comprising:

providing a standard housing suitable for containing said flat panel display assembly;

inserting a mother glass unit within said standard housing, said mother glass unit including bent tape-automated bonding (TAB) electronics electrically connected with said mother glass unit and with said computer system, said bent TAB electronics used for controlling information displayed on said mother glass unit;

inserting a backlight unit within said standard housing and behind said mother glass unit, said backlight unit suitable for providing light to said mother glass unit;

inserting a discrete electromagnetic pen digitizer within said standard housing and behind said mother glass unit, said discrete electromagnetic pen digitizer being relatively thin permitting easy integration into said standard housing and capable of receiving signals from said electromagnetic pen representing data for input to said computer system; and folding said bent TAB electronics of said mother glass unit behind said discrete electromagnetic pen digitizer such that said bent TAB electronics do not interfere with said signals from said electromagnetic pen, said bent TAB electronics being located substantially behind said mother glass unit such that a viewable area of said flat panel display assembly is relatively large compared to a non-viewable area of said flat panel display assembly.

22. A method as recited in claim 21 wherein said bent TAB electronics include a flexible cable for attachment to said mother glass unit with a sufficient length to permit said bent TAB electronics to be folded behind said discrete electromagnetic pen digitizer.

23. A method as recited in claim 21 wherein said flat panel display assembly is a standard assembly and said discrete electromagnetic pen digitizer is fabricated using flexible circuit technology such that said step of inserting a discrete electromagnetic pen digitizer permits easy integration of said discrete electromagnetic pen digitizer into said standard assembly.

24. A method as recited in claim 23 wherein said discrete electromagnetic pen digitizer has a thickness of about 0.3 mm to about 0.5 mm.

\* \* \* \* \*